United States Patent

De Brey

[15] 3,674,316

[45] July 4, 1972

[54] PARTICLE MONITOR

[72] Inventor: Robert J. De Brey, 1830 E. 42nd St., Minneapolis, Minn. 55407

[22] Filed: May 14, 1970

[21] Appl. No.: 37,157

[52] U.S. Cl. ..............................................302/65, 15/339
[51] Int. Cl. .......................................B65g 53/66, B47l 9/00
[58] Field of Search.........................15/339; 73/194 B; 302/65

[56] References Cited

UNITED STATES PATENTS

| 1,633,598 | 6/1927 | McClatchie | 15/339 X |
| 3,068,694 | 12/1962 | Worswick | 73/194 B |
| 2,936,619 | 5/1960 | Gibney | 73/194 B |

Primary Examiner—Evon C. Blunk
Assistant Examiner—W. Scott Carson
Attorney—Burd, Braddock & Bartz

[57] ABSTRACT

A particle monitoring device located in a line carrying a moving fluid, as air, containing particles. The device has a particle sensing member providing signals that are in direct proportion to the amount of particles in the moving fluid. The sensing member can be a flexible cover enclosing the large end of a housing having a side wall that increases in diameter as a function of distance from its inlet, as a funnel-shaped housing. Particles that hit the cover produce an audio signal providing information feedback of the amount of particles in the moving fluid.

13 Claims, 5 Drawing Figures

PATENTED JUL 4 1972

INVENTOR.
ROBERT J. DE BREY
BY
Burd, Braddock & Bartz
ATTORNEYS

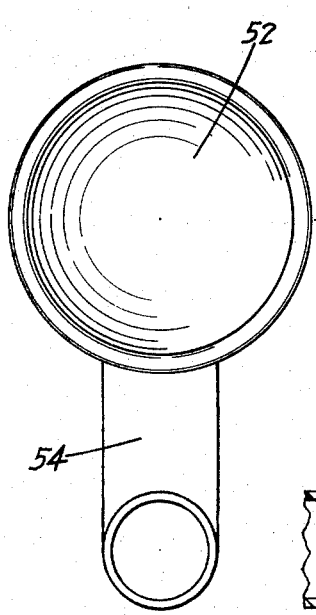
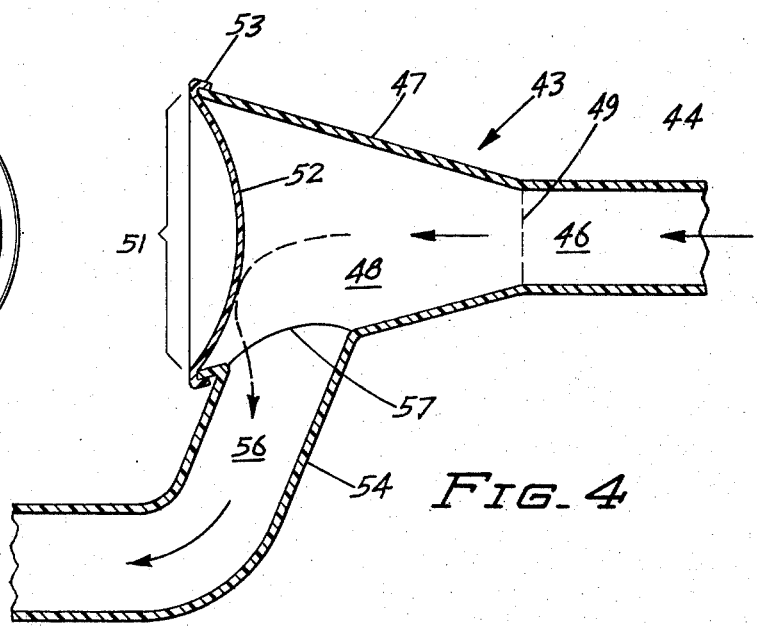

PARTICLE MONITOR

BACKGROUND OF INVENTION

Particle monitoring devices using visual, audio, electronic parameters are used to detect particles in moving fluids. Vacuum cleaner lines have been provided with particle or dirt traps which function as settling chambers for receiving the relatively heavy particles moving in the air stream. An example of this vacuum cleaner trap is shown in U.S. Pat. No. 3,267,650. Some vacuum lines have been provided with settling chambers for observing and separating heavy objects from a moving air stream. An example of this structure is shown in U.S. Pat. No. 944,779. The use of a visual window, or other visual indicating means, for the purposes of monitoring the amount of particles in a moving air stream, has proven ineffective, as the window material, glass or other transparent medium becomes clouded. Efforts to overcome the inadequacies of the visual monitoring systems have been made by the use of a small circular diaphragm, which will produce some audible sounds to provide an indication of dust or dirt in the air stream. An example of this structure is shown in U.S. Pat. No. 1,633,598.

SUMMARY OF INVENTION

The invention relates to an active monitoring or sensing device operable to provide an information feedback which is in a direct and reliable relationship to the amount of particles moving with a fluid, as air. The sensing device has a particle detecting surface located in an angular relationship with respect to the longitudinal axis of the flow of fluid carrying the particles. In one form of the invention, the sensing surface is on a flexible cover positioned over the large end of a funnel-shaped housing. The particles moving in the air stream strike the central portion of the cover to produce an audio sound which is amplified by the housing. The cover and housing are positioned in such manner that they are facing the operator of the device. A protective screen can be used on the outside of the diaphragm to prevent any damage to the cover.

IN THE DRAWINGS

FIG. 4 is a diagrammatic view of another particle monitoring apparatus of the invention; and FIG. 5 is a front elevational view of the particle monitoring apparatus of FIG. 4.

Figure 1:
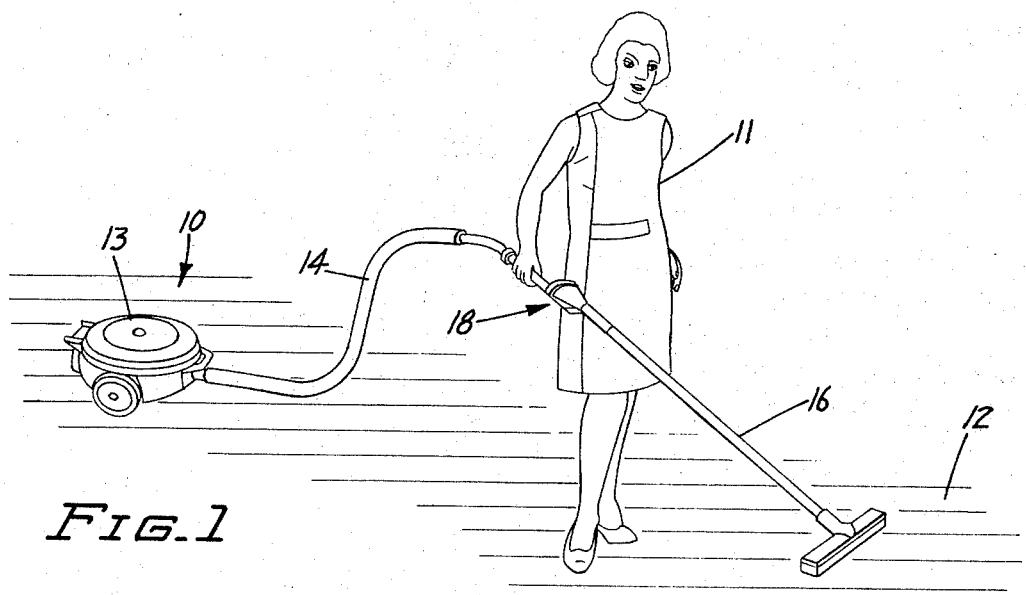
FIG. 1 is a side view of a canister vacuum cleaner equipped with the particle monitoring device of the invention.

Referring to the drawings, there is shown in FIG. 1 a vacuum cleaner, indicated generally at 10, being used by an operator 11, as a homemaker, for cleaning a floor or carpet 12. The cleaner 10 is a suction machine 13 having a motor, suction pump, and collection bag enclosed within a housing. Attached to the machine 13 is an elongated flexible hose 14 normally adapted to be connected to an elongated rigid tube 16 carrying a transverse nozzle or pick-up head 17. The upper end of the tube 16 is connected to the outer end of the hose 14 with the particle monitoring device of the invention, indicated generally at 18. The particle monitoring device is used to sense particles in the air moving through the device to provide the operator with information indicative of the amount of particles in the moving air. This information provides a direct and reliable relationship to the efficiency of the cleaning process. The operator will be able to determine when an area is clean and where extra cleaning attention is needed. The monitoring device 18 can be used with other types of vacuum cleaners, as well as other systems which use fluids to carry particles. The particle carrying fluid can be either a gas or liquid.

Figure 2:
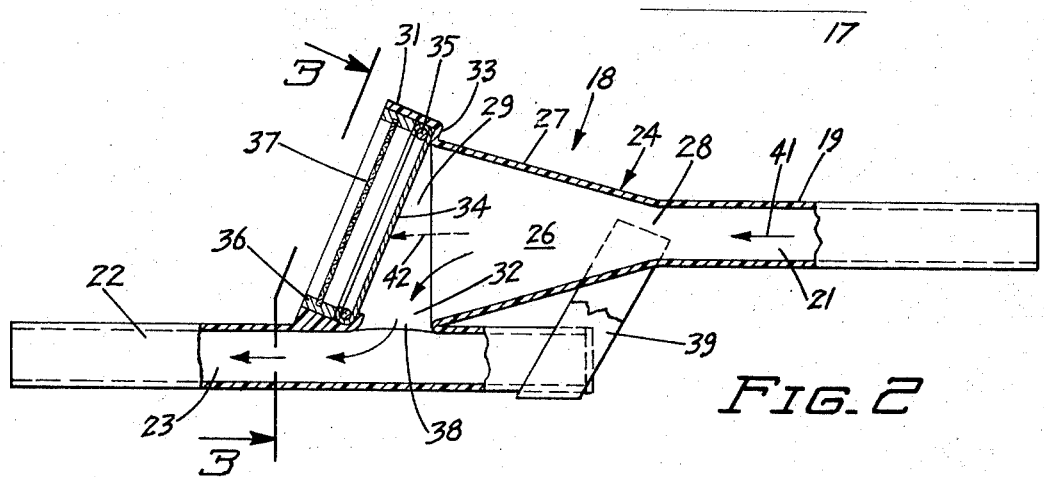
FIG. 2 is an enlarged side elevational view, partly sectioned, of the particle monitoring device of FIG. 1.
Figure 3:
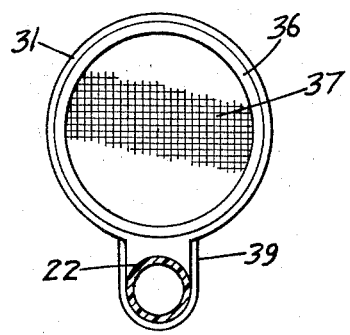
FIG. 3 is a plan view of the particle monitoring device facing the operator of the cleaner taken along line 3–3 of FIG. 2.

Referring to FIG. 2, the particle monitoring device 18 has an inlet tube 19 with a linear passage 21. Offset from the inlet tube 19 is an outlet tube 22 having a linear passage 23. The tubes 19 and 22 are connected to each other with a connecting assembly or housing, indicated generally at 24, having an enlarged cone-shaped expansion chamber 26 in communication with both passages 21 and 23. The cross sectional area of chamber 26 is substantially larger than the cross sectional area of the inlet opening 28. The ends of tubes 19 and 22 are of a size to fit with a telescope relation with the hose 14 and tube 16 so that the monitoring device 18 can be used with existing vacuum machines and can be detached for storage, cleaning and repair. The connecting assembly 24 has a funnel-shaped housing 27 having a small inlet end joined to the end of the tube 19 so that the inlet opening 28 of the chamber 26 is in axial alignment with the passage 21. The opposite end of the funnel-shaped housing 27 has a large open end 29. Preferably, the large open end 29 is about three times the diameter of the small inlet opening 28. Secured to the large end of the funnel housing 27 is a cylinder or sleeve 31 projected in an upward and outward direction. The axis of the cylinder 31 is between 20 and 30 degrees with respect to the horizontal axis of the housing 27. The space between the end of the housing 27 and the sleeve 31 is closed with a circular extension 32 so that the space between the funnel housing 27 and the sleeve 31 is part of the chamber 26.

The sleeve 31 has a diameter which is slightly larger than the diameter of the open end of the funnel housing 27 so that a small step or annular shoulder 33 joins the sleeve 31 to the housing 27 and extension 32. Extended across the base of the sleeve 31, in engagement with the shoulder 33, is a flexible circular cover or diaphragm 34. An annular expansion ring 35 holds the diaphragm in engagement with the sleeve 31. Other mechanical structure, as a large washer or clamp, can be used to hold the diaphragm on the sleeve 31. Only the peripheral edge of the diaphragm is held in engagement with the annular shoulder 33 so that the remainder of the diaphragm is free to vibrate and produce sound. The center of the diaphragm 34 is in alignment with the axial center line of the inlet passage 21. The center of diaphragm 34 can be below the center line of the inlet passage 21 so that the average particle impact point is at the approximate geometric center of the diaphragm.

The diaphragm 34 can be a relatively thin single sheet of plastic film, as Mylar film, having a 2 mil thickness. Other types of plastic sheets, as well as paper, metal foils and other materials of varying thickness, can be used as a diaphragm. The diaphragm can be laminated sheet material or sheet material reinforced with a woven wire plastic mesh. Preferably, the diaphragm should be made of material that is tough, flexible and has a high tear strength. The diaphragm is a sound producing membrane.

The diaphragm 34 is held in a downwardly and forwardly inclined position with respect to the longitudinal axis of passage 21, as shown in FIG. 2, in engagement with the shoulder 33, by a short sleeve or ring 36 located within the sleeve 31 with a light force fit. Extended across the sleeve 36 is a protective screen 37 to prevent outside objects from penetrating the diaphragm. The screen 37 may be made from fine wires or synthetic strands. For example, the screen may be a 12 mesh square pattern of stainless steel. This screen has an open area of approximately 52 per cent to permit a maximum transmission of sound from the diaphragm 34 and chamber 26. The screen 37 is spaced a short distance from the diaphragm 34 so as not to interfere with the vibration and sound producing functions of the diaphragm. The screen 37 can be placed very close to the outside surface of the diaphragm 34 so that it can be used as a backup or reinforcing member for the diaphragm to help prevent puncturing of the diaphragm with outside objects. A second screen (not shown) can be located adjacent the inside or chamber side of the diaphragm to limit inward stretching of the diaphragm. Also, the diaphragm can carry the reinforcing screen, as laminated sheet members, on opposite sides of a screen. Other types of mechanical barriers can be used to reinforce the diaphragm.

The lower portion of the extension 32 has an exit opening 38 which provides communication between the passage 23 and the chamber 26. The exit opening 38 is located adjacent the large open end of the funnel housing 27 immediately below the inclined or angularly positioned diaphragm 34. The outlet tube 22 is secured to the extension 32 around the opening 38. A portion of the tube 22 extends below the funnel housing 27 and is attached to the housing 27 with an upwardly directed U-shaped member 39. The U-shaped member 39 surrounds the closed end of the tube 22 so that the only fluid that flows through the tube 22 is withdrawn from the chamber 26.

The housing 27 can have other shapes, as semicircular, square, rectangular, pyramid or elliptical. These housings are characterized as having side walls which increase in diameter as a function of distance from its inlet.

In use, the suction machine 13 establishes a vacuum force which draws air and dirt particles through the nozzle 17 along the tube 16 through the monitoring device 18 and into the machine 13 through the flexible hose 14. This vacuum force places the flexible diaphragm 34 under tension. As the air and entrained particles, indicated at arrow 41 in FIG. 2, enter the monitoring device 18, they are directed into the expansion chamber 26 of the funnel housing 27 in an axial direction. The air flows directly at the diaphragm 34. In the chamber 26, the velocity of the air decreases and the air changes direction toward the outlet opening 38 for movement into the passage 23. The heavier particles having momentum impinge against or hit the central portion of the diaphragm 34 causing the diaphragm to vibrate. In addition, the particles, as they impinge on the diaphragm, create sounds which are projected outwardly toward the ear of the operator 11. The low velocity air flow in chamber 26 improves the chances of the particles hitting the diaphragm 34 because the particles are not immediately carried away by the moving air. The funnel shape of the housing 27 concentrates the sound waves and thereby increases their audio characteristics. In this manner, even relatively small particles can be detected by the human ear. After the impact of the particles, indicated by broken line arrows 42 on the diaphragm 34, they proceed downwardly with the air stream through the exit opening 38 into the outlet passage 23 and into the flexible hose 14. The inclined or angular position of the diaphragm 34 insures that all of the particles are drawn out of the expansion chamber 26 so that they do not recirculate and cause multiple impactions and false information of the amount of particles moving with the air.

The flow rate of the air through the particle monitoring device varies with the area of the various portions of the device. As the velocity of the air decreases in the expansion chamber 26, there is an increase in the pressure of the air in the chamber. The highest pressure would be just in front of the diaphragm 34. This reduces the stretching tension on the diaphragm 34 created by the vacuum pressure inside the system. Accordingly, a thinner and more sensitive diaphragm material can be employed and thereby increase the sensitivity of the sensing device.

The monitoring device 18 provides the operator 11 of the vacuum cleaner with audio information that is directly related to the number of particles striking the diaphragm 34. Thus, the operator has a direct and reliable relationship as to the operating efficiency of the cleaner or the effectiveness of the cleaning operation. This information will enable the operator to be able to determine when an area is clean and if extra cleaning attention is needed. In addition, the operator will have the psychological reward that the cleaning efforts are effective. In industrial or laboratory uses, the particle monitoring device can be used to insure and inspect the cleanliness of a cleaned area, thereby determining the operating efficiency of other cleaning equipment that is used to produce clean environments.

Referring to FIGS. 4 and 5, there is shown a modified particle monitoring device, indicated generally at 43, for sensing particles in a moving fluid, as air. The device 43 has an inlet tube 44 having a passage 46 for carrying the fluid and entrained particles from a source. The tube 44 is connected to the inlet end of a funnel-shaped housing 47 having a cone-shaped transitional expansion chamber 48. The expansion chamber has an inlet opening 49 in axial alignment with the inlet passage 46 and a large outer circular end 51. A cover or diaphragm 52 of sound producing material, as plastic, sheet metal or the like, fits on the outer end of the funnel-shaped housing 47. The peripheral portion of the cover has a generally U-shaped annular lip 53 which clamps onto the end of the housing. Other structures can be used to attach the cover 52 to the housing 47. The cover 53 has a slight concave shape which projects into the expansion chamber 48. The axis of the concave curvature of the cover 52 is in generally axial alignment with the longitudinal axis of the chamber 48. Secured to the lower portion of the housing 47 is an angular-shaped outlet tube 54 having a passage 56 leading to the source of vacuum pressure. The exit opening 57, adjacent the inside of the cover 52, opens to the passage 56 so that the air can flow from the expansion chamber 48 through the exit passage 56. Opening 57 is directly below the concave cover 52 so that the particles that hit the cover 52 will move from the chamber 48 to the outlet passage 56.

In use, the expansion chamber 48, having a cross sectional area larger than the cross sectional area of the passage 46 and exit passage 56, causes a reduction in the velocity of the movement of the air through the chamber 48 and an increase in the pressure of the air in the chamber 48. The decrease in the velocity of the air insures that substantially all of the particles entrained in the air will strike the cover 52 with sufficient force to produce an audible signal.

The drawings and description are directed to the preferred embodiments of the invention. Modifications and alterations in the size, shape, materials, sensors and output reading devices may be made by one skilled in the art without departing from the spirit and scope of the invention.

I claim:

1. An apparatus for sensing particles in a flowing fluid comprising: first means having a first passage for carrying fluid, second means having a second passage for carrying fluid, said second passage located offset from the first passage and having a portion thereof in substantial parallel alignment with the first passage, connecting means joining the first means with the second means, said connecting means comprising a housing having an inside wall surrounding a large chamber open to the first passage and an outlet opening to the second passage whereby fluid and particles flow through said chamber, said housing having an inlet opening in communication with the first passage and an open end, said open end being substantially larger than the inlet opening, said chamber increasing in cross section as a function of distance away from the inlet opening toward the open end, particle sensing means mounted on said housing and located across the open end of said housing opposite the inlet opening adjacent the outlet opening and inclined with respect to the longitudinal axis of the first passage, said sensing means comprising flexible sheet means located across the open end of the housing, said sheet means having an outer peripheral portion and a portion extendible in a concave shape into the chamber to provide a barrier for particles moving with the fluid flowing through said chamber whereby when said particles strike said sheet means a readable sound signal related to the flow of particles through the chamber is established, and means mounting only said outer peripheral portion of the sheet means to said housing.

2. The apparatus of claim 1 wherein: the housing has a generally funnel-shaped chamber.

3. The apparatus of claim 1 wherein: the center portion of the sheet means is in general axial alignment with the longitudinal axis of the first passage.

4. The apparatus of claim 1 including: mechanical barrier means located adjacent the sheet means.

5. The apparatus of claim 1 wherein: the sheet means is a relatively thin and flexible sheet of material.

6. The apparatus of claim 1 wherein: said means mounting only said outer peripheral portion of the sheet means on the housing includes annular means cooperating with only the outer peripheral portion of the sheet means.

7. The apparatus of claim 1 wherein: the sheet means is a sheet of plastic film.

8. The apparatus of claim 1 wherein: said sheet means comprises laminated sheet members.

9. The apparatus of claim 1 wherein: said sheet means comprises laminated sheet members in combination with reinforcing mechanical barrier means.

10. The apparatus of claim 1 wherein: the sheet means is a sound producing membrane closing the large end of the housing and including a source of vacuum pressure coupled to the second means whereby a vacuum force maintains the membrane under tension.

11. The apparatus of claim 1 wherein: the means holding only the outer peripheral portion of the sheet means on the housing is an annular member mounted on the housing and engageable with the outer peripheral portion of the sheet means.

12. The apparatus of claim 1 including: mechanical barrier means comprising open screen means attached to the housing and located adjacent said sheet means.

13. The apparatus of claim 1 wherein: the sheet means is in an inclined position to direct gas and particles toward the outlet opening.

* * * * *

PO-1050
(5/69)

UNITED STATES PATENT OFFICE
CERTIFICATE OF CORRECTION

Patent No. 3,674,316      Dated July 4, 1972

Inventor(s) Robert J. De brey

It is certified that error appears in the above-identified patent and that said Letters Patent are hereby corrected as shown below:

In the heading, [72] Inventor:, "Robert J. De Brey"
should be --Robert J. De brey--

Signed and sealed this 17th day of October 1972.

(SEAL)
Attest:

EDWARD M. FLETCHER, JR.           ROBERT GOTTSCHALK
Attesting Officer          Commissioner of Patents